(12) United States Patent
Ganev et al.

(10) Patent No.: US 7,330,345 B2
(45) Date of Patent: Feb. 12, 2008

(54) VALVE CONTROL METHOD FOR CIRCUITRY FOR POWER GENERATION SYSTEMS

(75) Inventors: Evgeni Ganev, Torrance, CA (US); William H. Warr, Glendale, CA (US)

(73) Assignee: Honeywell International, Inc., Morristown, NJ (US)

( * ) Notice: Subject to any disclaimer, the term of this patent is extended or adjusted under 35 U.S.C. 154(b) by 443 days.

(21) Appl. No.: 11/125,904

(22) Filed: May 9, 2005

(65) Prior Publication Data
US 2006/0249121 A1    Nov. 9, 2006

(51) Int. Cl.
*H01H 47/00* (2006.01)
(52) U.S. Cl. ...................................... 361/191
(58) Field of Classification Search ................ 361/154, 361/191
See application file for complete search history.

(56) References Cited

U.S. PATENT DOCUMENTS

| 3,999,787 | A | 12/1976 | Park |
| RE29,485 | E | 11/1977 | Park |
| 4,071,870 | A | 1/1978 | Bloch et al. |
| 4,589,401 | A | 5/1986 | Karim et al. |
| 4,884,025 | A * | 11/1989 | Hausler ...................... 324/766 |
| 4,980,793 | A | 12/1990 | Glowczewski et al. |
| 5,202,813 | A | 4/1993 | Uota et al. |
| 5,684,371 | A | 11/1997 | Tarui et al. |
| 5,917,691 | A | 6/1999 | Kadah |
| 5,938,172 | A | 8/1999 | Ohtsuka et al. |
| 6,473,286 | B1 | 10/2002 | Itabashi et al. |
| 6,748,929 | B2 | 6/2004 | Przymusinski et al. |
| 7,109,131 | B2 * | 9/2006 | Herring et al. ............. 438/787 |
| 7,203,554 | B2 * | 4/2007 | Fuller .......................... 700/28 |

FOREIGN PATENT DOCUMENTS

EP    1022494 A2 *   7/2000

* cited by examiner

*Primary Examiner*—Michael Sherry
*Assistant Examiner*—Christopher J Clark
(74) *Attorney, Agent, or Firm*—Oral Caglar, Esq.

(57) ABSTRACT

A fail-safe control system for controlling valves in power generation systems is presented. The AC-coupled, rectified signal supplied to one valve is disabled in the event that the other valve fails. This failure is sensed, for example, through the use of power sensing circuitry configured to sense and multiply the voltage and current applied to the valve. Components such as capacitors and transformers are used exclusively such that only AC power (and not DC power) is transferred, ensuring that, in the worst case, the valves are disabled in the event of a failure.

13 Claims, 3 Drawing Sheets

VALVE CONTROL METHOD FOR CIRCUITRY FOR POWER GENERATION SYSTEMS

FIELD OF THE INVENTION

The invention generally relates to power generation systems and, more particularly, to a fail-safe valve configuration for use with bi-propellant fuel systems and the like.

DESCRIPTION OF RELATED ART

Turbine power systems are often used in conjunction with both stationary and vehicular applications and are typically configured to produce hydraulic power, electric power, shaft power, or a combination thereof. The turbine is typically driven by hot, compressed gas, and high-precision valves are used to control the delivery of fuel and hence the amount of generated power.

A variety of valves are used in such systems, ranging from bi-state valves (valves which have only two positions—"on" and "off") to proportional valves (valves which can be adjusted over a range of flow settings). Proportional valves tend to be more costly and less reliable than bi-state valves, particularly in bi-propellant combustion systems where two separate flow rates need to be precisely metered.

In applications where bi-state valves are used, it is desirable to ensure fail-safe operation. That is, the bi-state valves should fail in a "closed" position in order to prevent propellant flow that could cause over-speed or over-temperature failures. Failure of a first valve is ideally coordinated with control of a second valve.

Unfortunately, bi-state valves used in connection with turbine control applications do not include a means of detecting their own position. Furthermore, even though bi-state valves may be configured such that they are normally off (i.e., when not energized), many control systems include passive and active components that can transfer DC power to the bi-state valves even when these individual components fail, increasing the risk that the bi-state valves will be energized during system failure.

Thus, it should be appreciated that a need exists for improved fail-safe control of bi-state valves. The invention fulfills this need as well as others.

SUMMARY OF THE INVENTION

In general, the invention provides systems and methods for fail-safe control of valves in power generation systems—for example, valves used in conjunction with bi-propellant systems. In one embodiment, the AC-coupled, rectified signal supplied to one valve is disabled in the event that the other valve fails. This failure is sensed, for example, through the use of power sensing circuitry configured to sense and multiply the voltage and current applied to the valve. In one embodiment, components such as capacitors and transformers are used exclusively such that only AC power (and not DC power) is transferred, ensuring that, in the worst case, the valves are disabled in the event of failure (e.g., software and/or hardware failure).

In one embodiment, a valve control system includes one or more of the following components: a first valve and a second valve; a power sensor circuit coupled to the second valve, the power sensor circuit configured to produce a feedback signal responsive to a measurement of power associated with the second valve; a logical component having a first input, a second input, and an output, wherein the output is a logical AND of the first and second inputs, the first input being coupled to a first valve signal, and the second input being coupled to the feedback signal; a first transformer driver coupled to the output of the logical component; a second transformer driver coupled to a second valve signal; a first transformer coupled to an output of the first transformer driver; a second transformer coupled to an output of the second transformer driver; a first rectifier circuit coupled to the first transformer and the first valve; and a second rectifier circuit coupled to the second transformer and the second valve.

These and other features and advantages of the embodiments of the invention will become apparent from the following detailed description, taken in conjunction with the accompanying drawings, which illustrate, by way of example, the principles of the invention.

DETAILED DESCRIPTION OF THE PREFERRED EMBODIMENTS

Systems and methods that implement the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements.

Figure 1:
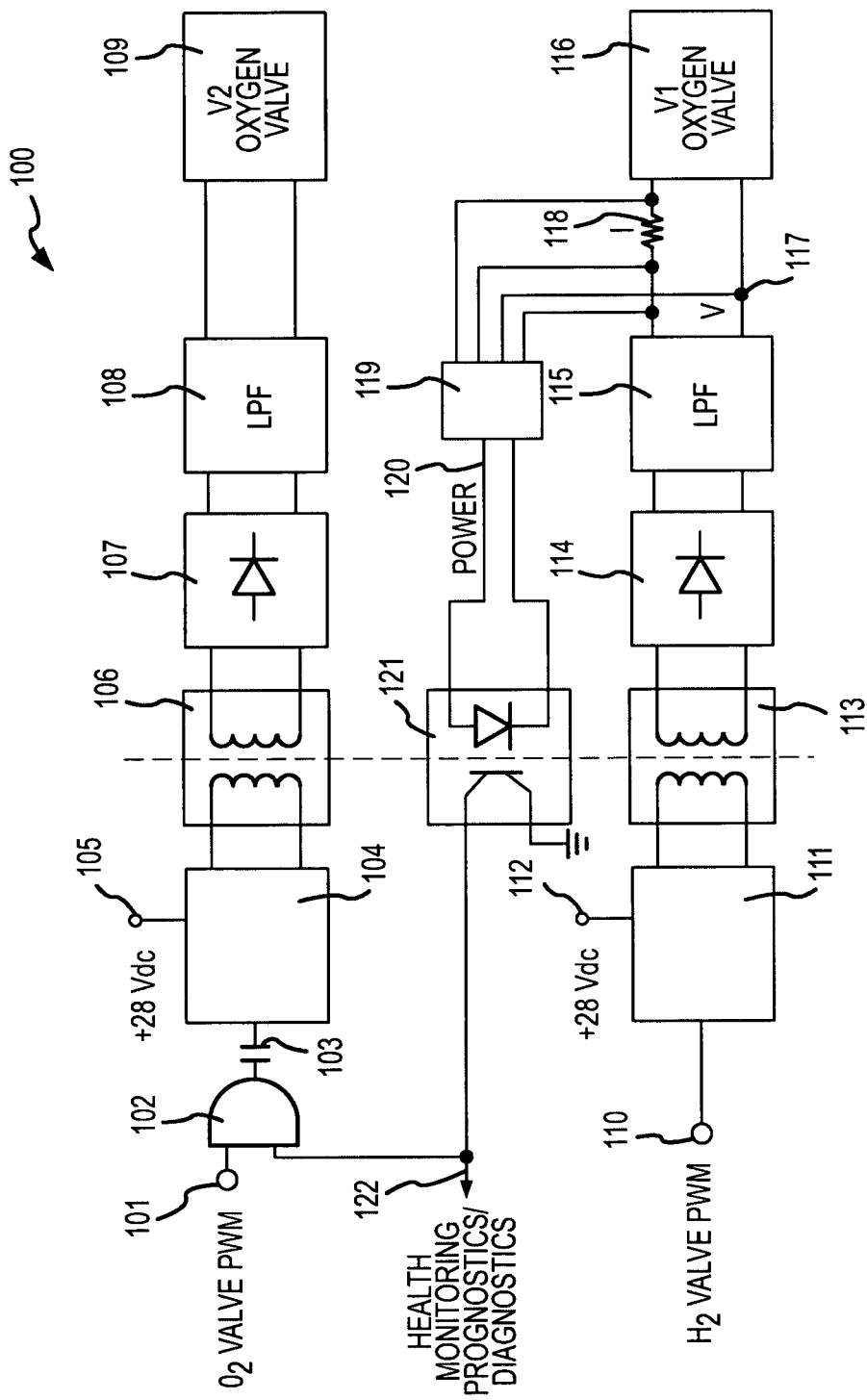
FIG. 1 is a simplified block diagram of valve control circuitry in accordance with one embodiment of the present invention.

With reference to the drawings, FIG. 1 is a simplified block diagram of a valve driver 100 in accordance with one embodiment of the present invention. In general, valve signals (e.g., pulse width modulation (PWM) signals) 101 and 110 are used to drive respective valves 109 and 116 via intervening fail-safe control circuitry as described in detail below. In this regard, while the illustrated embodiment is framed in the context of hydrogen and oxygen valves, the invention is not so limited; the described circuitry and methods are applicable to a variety of bi-propellant applications as well as any application where two or more valves are employed.

With continued reference to FIG. 1, the valve signal 101 is gated via logical AND element 102 and a feedback signal 122. The resulting signal is then isolated using a capacitor or other isolation element 103. The AC output of the logical AND element 102 therefore follows the valve signal 101 only when the feedback signal 122 is a logical "1". If the logical AND element 102 fails, its output will be either a logical "0" or "1", and in either case the AC valve signal 101 (i.e., from a digital signal processor (DSP) or similar component) will not be transferred.

A transformer driver 104, shown with a +28VDC power source 105 in this embodiment, transfers the amplified AC power from element 103 during normal operation. Thus, the transformer driver 104 divides the circuitry into two galvanically-isolated parts—a primary side (to the left of the dashed line through transformer 106), and a secondary side (to right of the dashed line).

A rectifier 107 or other suitable circuitry converts the AC signal from the transformer 106 into a substantially DC signal. A low-pass filter (LPF) 108 is then used to provide smoothing of the resulting rectified voltage signal, which is then used to drive valve 109. With respect to valve PWM signal 110, transformer driver 111, supply 112, transformer 113, rectifier 114, and low pass filter 115 are used to drive valve 116 in the same or similar manner.

In one embodiment, valves 109 and 116 are discrete, bi-state valves of the "normally shut" type. That is, power must be provided (via signals 101 and 110) in order to energize and open the valves 109 and 116.

Measurement components 117 and 118 are used to measure the voltage and current, respectively, across valve 116. Such voltage and current measurement techniques are known in the art. The resulting values are multiplied via component 119 to produce a measurement of the electric power delivered to valve 116. In the event the circuit is open, the current will be zero and the power signal 120 will likewise by zero. In the case of a short circuit failure, the voltage will be zero and the power signal 120 will be zero. Therefore, the power signal 120 is a true representation of the valve status whether the valve 116 is energized or de-energized. That is, power signal 120 represents valve status irrespective of whether the valve 116 is operating normally or has failed. In this way, the position of the valve (which itself does not include any position-sensing capability) can be indirectly determined through monitoring of valve current and voltage.

Item 121 is an opto-coupler or other such signal-isolating component that transfers the power signal 120 from the secondary side to the primary side of the circuitry. The feedback signal 122 may be used for health monitoring, prognostics, and diagnostic purposes. As described above, the feedback signal 122 is connected to the logical AND element 102 to inhibit valve 109 operation when valve 116 is in a fail condition. Thus, the illustrated embodiment provides a fail-safe condition in the event that any of the individual components experience a fail condition.

Figure 2A:
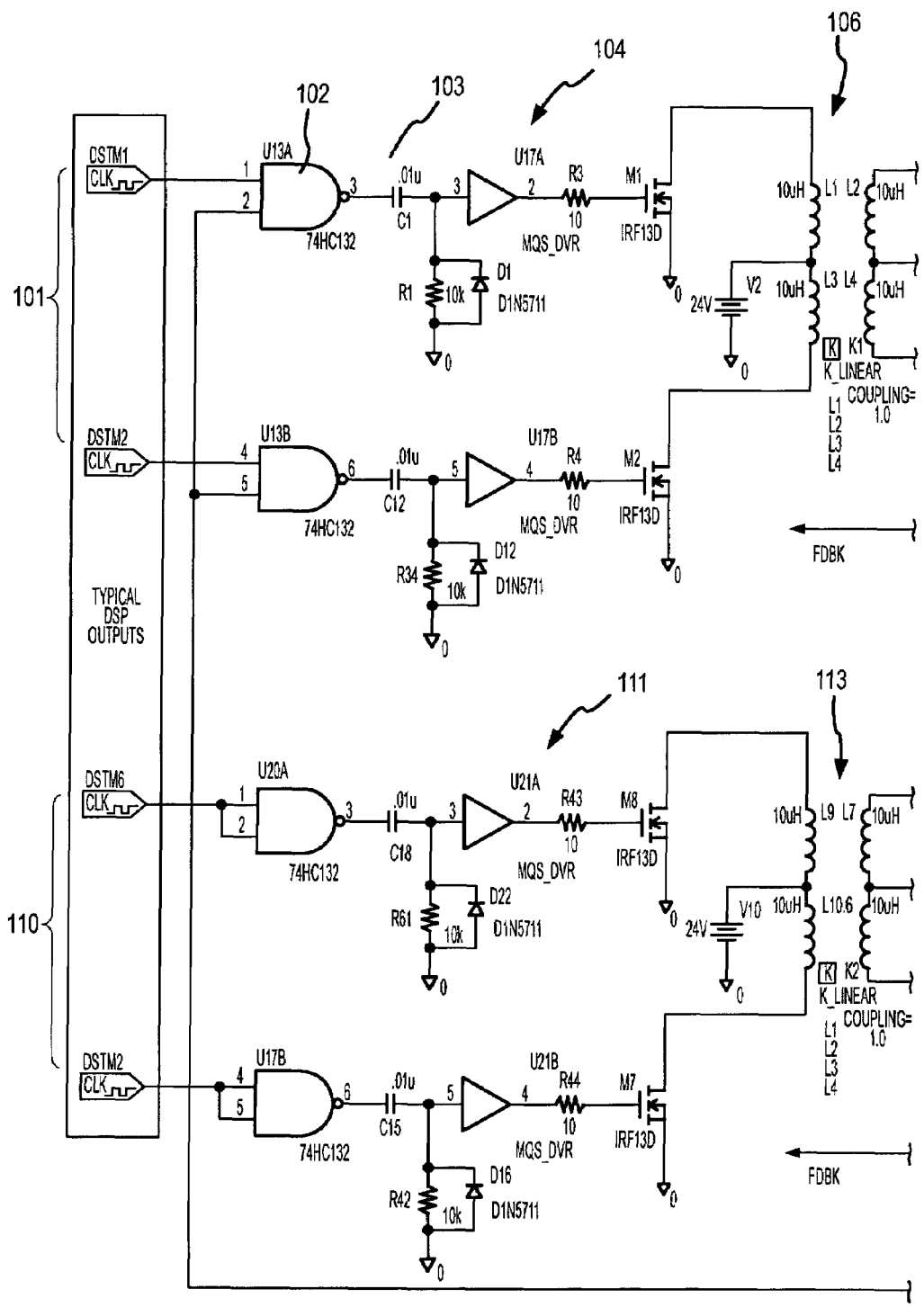
FIGS. 2A and 2B is a schematic diagram of valve control circuitry in accordance with another embodiment of the present invention.
Figure 2B:
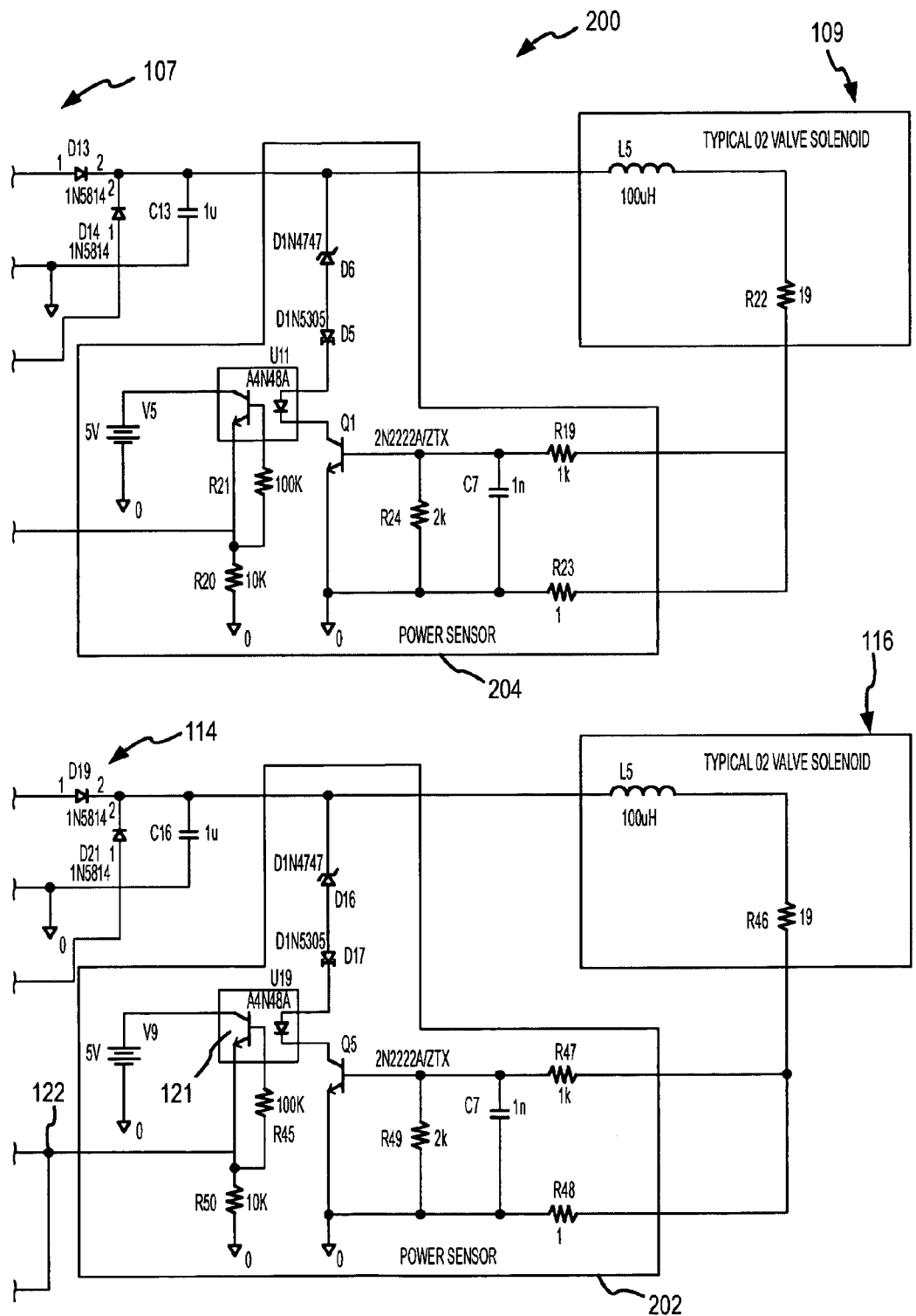

FIGS. 2A and 2B presents an exemplary valve driver schematic diagram used for the purpose of generating a failure mode and effects analysis (FMEA) of the illustrated circuit. Those skilled in the art will recognize the symbols, nomenclature, and conventions used in FIGS. 2A and 2B. In general, valve driver 200 includes DSP output signals 101 and 110 used to control valves (i.e., valve solenoids) 109 and 116. Power sensor circuitry 202 and 204 are used in connection with valves 116 and 109. Each valve has corresponding circuitry for logical AND element 102, capacitor 103, transformer driver 104 (e.g., a MOSFET-based transformer driver), transformer 106, rectifier 107, and so on. The particular circuit configurations shown for the various functional blocks are not meant to be limiting, but merely show example circuits that can be used to implement the invention.

Table 1 below presents FMEA results for the circuit shown in FIGS. 2A and 2B. That is, a PSpice simulation of the circuit shown in FIGS. 2A and 2B was subjected to various failure modes to determine the manner in which the system would fail. Component labels from FIGS. 2A and 2B are used in the "component" column.

TABLE 1

Exemplary FMEA Results

| Component | Failure Type | Effect |
|---|---|---|
| DSP | Fail HIGH | No pulse train will propagate, therefore, one side of transformer will not be switched. Voltage on secondary side of the transformer will be reduced and power sensor will allow DSP to sense a fault. |
| DSP | Fail LOW | No pulse train will propagate, therefore, one side of transformer will not be switched. Voltage on secondary side of the transformer will be reduced and power sensor will allow DSP to sense a fault: |
| DSP | Fail OPEN | No pulse train will propagate, therefore, one side of transformer will not be switched. Voltage on secondary side of the transformer will be reduced and power sensor will allow DSP to sense a fault. |
| DSP | Fail SHORT | No pulse train will propagate, therefore, one side of transformer will not be switched. Voltage on secondary side of the transformer will be reduced and power sensor will allow DSP to sense a fault. |
| U13A, 13B, 20A, 20B | Fail HIGH | No pulse train will propagate, therefore, one side of transformer will not be switched. Voltage on secondary side of the transformer will be reduced and power sensor will allow DSP to sense a fault. |
| U13A, 13B, 20A, 20B | Fail LOW | No pulse train will propagate, therefore, one side of transformer will not be switched. Voltage on secondary side of the transformer will be reduced and power sensor will allow DSP to sense a fault. |
| U13A, 13B, 20A, 20B | Fail OPEN | No pulse train will propagate, therefore, one side of transformer will not be switched. Voltage on secondary side of the transformer will be reduced and power sensor will allow DSP to sense a fault. |
| U13A, 13B, 20A, 20B | Fail SHORT | No pulse train will propagate, therefore, one side of transformer will not be switched. Voltage on secondary side of the transformer will be reduced and power sensor will allow DSP to sense a fault. |
| U17A, 17B, 21A, 21B | Fail HIGH | No pulse train will propagate, therefore, one side of transformer will not be switched. Voltage on secondary side of the transformer will be reduced and power sensor will allow DSP to sense a fault. (The 24 V source will have to be removed to prevent damage to the transformer.) |
| U17A, 17B, 21A, 21B | Fail LOW | No pulse train will propagate, therefore, one side of transformer will not be switched. Voltage on secondary side of the transformer will be reduced and power sensor will allow DSP to sense a fault. |
| U17A, 17B, 21A, 21B | Fail OPEN | No pulse train will propagate, therefore, one side of transformer will not be switched. Voltage on secondary side of the transformer will be reduced and power sensor will allow DSP to sense a fault. |
| U17A, 17B, 21A, 21B | Fail SHORT | No pulse train will propagate, therefore, one side of transformer will not be switched. Voltage on secondary side of the transformer will be reduced and power sensor will allow DSP to sense a fault. |
| C1, 12, 18, 15 | Fail OPEN | No pulse train will propagate, therefore, one side of transformer will not be switched. Voltage on secondary side of the transformer will be reduced and power sensor will allow DSP to sense a fault. |
| C1, 12, 18, 15 | Fail SHORT | AC coupling will be lost and one side of the transformer may be left ON after a pulse train causing the transformer to overheat. (The 24 V source will have to be removed to prevent damage to the transformer.) |
| R1, 34, | Fail | One side of the transformer may be left |

TABLE 1-continued

Exemplary FMEA Results

| Component | Failure Type | Effect |
|---|---|---|
| 51, 42 | OPEN | ON after a pulsetrain causing the transformer to overheat. (The 24 V source will have to be removed to prevent damage to the transformer.) |
| R1, 34, 51, 42 | Fail SHORT | No pulse train will propagate, therefore, one side of transformer will not be switched. Voltage on secondary side of the transformer will be reduced and power sensor will allow DSP to sense a fault. |
| D1, 12, 22, 16 | Fail OPEN | AC coupling will lose its DC offset. Input to U17A may not "see" the proper voltage to propagate a pulse train. If no pulse train propogates, one side of the transformer will not be switched. Voltage on the secondary side of the transformer will be reduced and the power sensor will allow the DSP to sense a fault. |
| D1, 12, 22, 16 | Fail SHORT | No pulse train will propagate, therefore, one side of transformer will not be switched. Voltage on secondary side of the transformer will be reduced and power sensor will allow DSP to sense a fault. |
| R3, 4, 43, 44 | Fail OPEN | No pulse train will propagate, therefore, one side of transformer will not be switched. Voltage on secondary side of the transformer will be reduced and power sensor will allow DSP to sense a fault. |
| R3, 4, 43, 44 | Fail SHORT | Speed of switch will change. No detectable effect. |
| M1, 2, 7, 8 | Fail OPEN | One side of transformer will not be switched. Voltage on secondary side of the transformer will be reduced and power sensor will allow the DSP to sense a fault. |
| M1, 2, 7, 8 | Fail SHORT | One side of the transformer will be left ON causing the transformer to overheat. (The 24 V source will have to be removed to prevent damage to the transformer.) |
| D13, 19 | Fail OPEN | Voltage on secondary side of the transformer will be reduced and power sensor will allow the DSP to sense the fault. |
| D13, 19 | Fail SHORT | AC rectification is lost. Power sensor will allow DSP to sense a fault. |
| D14, 21 | Fail OPEN | Voltage on secondary side of the transformer will be reduced and power sensor will allow the DSP to sense the fault. |
| D14, 21 | Fail SHORT | AC rectification is lost. Power sensor will allow DSP to sense a fault. |
| D15, 20 | Fail OPEN | Flyback current is prevented so the secondary side DC voltage will see voltage spiking. |
| D15, 20 | Fail SHORT | Valve cannot be energized. Power sensor will allow DSP to sense fault. |
| C13, 16 | Fail OPEN | No filtering. No detectable fault. |
| C13, 16 | Fail SHORT | Power sensor will allow DSP to sense a fault. |
| Power Sensors | Fail HIGH | DSP will "see" the fault. (Indicating ON when OFF) |
| | Fail LOW | DSP will "see" the fault. (Indicating OFF when ON) |

As shown in Table 1, for each of the failure modes designated for the listed components, the resultant failure mode will not result in either of the valves being energized.

In summary, then, the invention provides systems and methods for fail-safe control of valves in power generation systems. The AC-coupled, rectified signal supplied to one valve is disabled in the event that the other valve fails, and components such as capacitors and transformers are used exclusively such that only AC power (and not DC power) is transferred, ensuring that, in the worst case, the valves are disabled in the event of failure.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. For example, while the invention was described primarily in the context of a hydrogen-oxygen bi-propellant system, the invention may be used in any application where multiple bi-state valves are used. Accordingly, the invention is not intended to be limited by the preferred embodiments, but is to be defined by reference to the appended claims.

What is claimed is:

1. A valve control system comprising:
   a first valve and a second valve;
   a power sensor circuit coupled to the second valve, the power sensor circuit configured to produce a feedback signal responsive to a measurement of power associated with the second valve;
   a logical component having a first input, a second input, and an output, wherein the output is a logical AND of the first and second inputs, the first input being coupled to a first valve signal, and the second input being coupled to the feedback signal;
   a first transformer driver coupled to the output of the logical component;
   a second transformer driver coupled to a second valve signal;
   a first transformer coupled to an output of the first transformer driver;
   a second transformer coupled to an output of the second transformer driver;
   a first rectifier circuit coupled to the first transformer and the first valve; and
   a second rectifier circuit coupled to the second transformer and the second valve.

2. The valve control system of claim 1, wherein the power sensor circuit includes an isolation component.

3. The valve control system of claim 1, further including a capacitive component between the logical component and the first transformer driver.

4. The valve control system of claim 1, wherein the first and second valves are two-state, "normally off" valves.

5. The valve control system of claim 1, wherein the transformer driver comprises a metal-oxide semiconductor field-effect transistor (MOSFET).

6. The valve control system of claim 1, wherein the first valve comprises an oxygen valve and the second valve comprises a hydrogen valve configured to be used in a bi-propellant system.

7. A method of providing fail-safe control of a power generation system having a first bi-state, normally-off valve and a second bi-state, normally-off valve, the method comprising:
   receiving a first drive signal and a second drive signal, wherein the first and second drive signals comprise pulse trains;
   providing a rectified, AC-coupled signal to the first valve in response to the first drive signal;
   providing a rectified, AC-coupled signal to the second valve in response to the second drive signal;
   sensing a power measurement associated with the second valve; and removing the rectified, AC-coupled signal from the first valve when the power measurement is substantially zero.

8. The method of claim 7, further comprising monitoring, via a digital signal processor, the power measurement associated with the second valve.

9. The method of claim 7, wherein the first valve comprises an oxygen valve and the second valve comprises a hydrogen valve configured to be used in a bi-propellant system.

10. A fail-safe control system for controlling a first bi-state valve and a second bi-state valve in response to a first valve signal and a second valve signal, wherein said first and second valve signals are pulse width modulation signals, said control system comprising:
- a first valve drive circuit configured to provide AC coupling of the first valve signal to a primary part of a first transformer, wherein a secondary part of the first transformer is coupled to a rectifier configured to drive the first valve;
- a second valve drive circuit configured to provide AC coupling of the second valve signal to a primary part of a second transformer, wherein a secondary part of the second transformer is coupled a rectifier circuit configured to drive the second valve;
- a power sensor circuit configured to produce a feedback signal responsive to a measurement of power associated with the second valve; and
- a fault monitoring circuit coupled to the power sensor circuit, the first valve, and the second valve, said fault monitoring circuit configured to disable the first valve in the event that the feedback signal reflects substantially zero power.

11. The fail-safe control system of claim 9, wherein the first valve comprises an oxygen valve and the second valve comprises a hydrogen valve configured to be used in a bi-propellant system.

12. The fail-safe control system of claim 9, wherein the transformer driver comprises a metal-oxide semiconductor field-effect transistor (MOSFET).

13. The fail-safe control system of claim 9, wherein the power sensor circuit includes an isolation component.

* * * * *